US011019035B2

(12) United States Patent
Zhao et al.

(10) Patent No.: US 11,019,035 B2
(45) Date of Patent: *May 25, 2021

(54) CONTAINER DEPLOYMENT FOR A NETWORK

(71) Applicant: Verizon Patent and Licensing Inc., Arlington, VA (US)

(72) Inventors: Yuhang Zhao, Lexington, MA (US); Manish Chugtu, Bedford, MA (US); Girish S. Welling, Nashua, NH (US); Anmol Wadhwa, Nashua, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,490

(22) Filed: Jun. 27, 2019

(65) Prior Publication Data

US 2019/0319930 A1 Oct. 17, 2019

Related U.S. Application Data

(63) Continuation of application No. 15/462,166, filed on Mar. 17, 2017, now Pat. No. 10,356,048.

(51) Int. Cl.
*H04L 29/06* (2006.01)

(52) U.S. Cl.
CPC ........ *H04L 63/0281* (2013.01); *H04L 63/029* (2013.01)

(58) Field of Classification Search
CPC ........... H04L 41/00; H04L 41/08–0806; H04L 41/0893; H04L 41/50; H04L 41/5041;
(Continued)

(56) References Cited

U.S. PATENT DOCUMENTS 8,639,783 B1* 1/2014 Bakke .................. H04L 49/70
709/220
9,256,467 B1* 2/2016 Singh .................. G06F 9/5055
(Continued)

OTHER PUBLICATIONS

Diaz, George; "Docker Compose Your ClientSide and API Apps," Nov. 23, 2016. (Year: 2016).
(Continued)

*Primary Examiner* — Alina A Boutah

(57) ABSTRACT

A device can determine that a container is deployed in a front-end of a private network. The container can include a self-contained execution environment. The container can include an interface that is configured for directing network traffic between the front-end of the private network and one or more applications operating in a back-end of the private network. The device can configure an interface of the container for directing network traffic between an external network and the container. The device can configure a firewall of the front-end of the private network to permit routing of network traffic between the external network and the container. The device can advertise a route for directing network traffic between the external network and the container. The device can perform routing of network traffic between the one or more applications operating in the back-end of the private network and the external network using the container.

20 Claims, 5 Drawing Sheets

(58) Field of Classification Search
CPC ..... H04L 41/5045; H04L 41/12; H04L 67/00; H04L 67/10; H04L 67/16; H04L 67/28; H04L 63/00–0209; H04L 63/18; H04L 63/0281; G06F 8/00; G06F 8/60; G06F 9/5083

See application file for complete search history.

(56) References Cited

U.S. PATENT DOCUMENTS

| | | | |
|---|---|---|---|
| 9,276,816 B1* | 3/2016 | Conte | H04L 41/12 |
| 9,405,593 B2* | 8/2016 | McGrath | G06F 9/5077 |
| 9,690,622 B1* | 6/2017 | Argenti | G06F 9/5027 |
| 9,813,379 B1* | 11/2017 | Shevade | H04L 41/5051 |
| 10,104,185 B1* | 10/2018 | Sharifi Mehr | H04L 41/0896 |
| 10,191,916 B1* | 1/2019 | Faibish | G06F 11/1484 |
| 10,205,701 B1* | 2/2019 | Voss | H04L 61/1511 |
| 10,284,557 B1* | 5/2019 | Nossik | H04L 63/0218 |
| 2003/0110242 A1* | 6/2003 | Brown | H04L 67/02 709/222 |
| 2004/0143631 A1* | 7/2004 | Banerjee | H04L 67/2819 709/206 |
| 2007/0067479 A1* | 3/2007 | Angelov | H04L 69/22 709/231 |
| 2007/0174288 A1* | 7/2007 | Stoyanova | H04L 67/02 |
| 2008/0016516 A1* | 1/2008 | Brunswig | G06F 9/54 719/315 |
| 2008/0123536 A1* | 5/2008 | Johnson | H04L 41/12 370/241 |
| 2008/0168528 A1* | 7/2008 | Lin | H04L 63/105 726/1 |
| 2011/0145794 A1* | 6/2011 | Gerginov | G06F 11/3696 717/125 |
| 2011/0255538 A1* | 10/2011 | Srinivasan | H04L 41/0893 370/392 |
| 2014/0068611 A1* | 3/2014 | McGrath | G06F 9/5083 718/1 |
| 2014/0122996 A1* | 5/2014 | Gupta | G06F 8/38 715/234 |
| 2015/0089224 A1* | 3/2015 | Beckman | H04L 63/10 713/168 |
| 2015/0150113 A1* | 5/2015 | Robb | H04L 63/0281 726/12 |
| 2015/0229628 A1* | 8/2015 | Kosim-Satyaputra | H04L 67/34 726/4 |
| 2016/0112256 A1* | 4/2016 | Papageorgiou | H04L 41/0806 709/222 |
| 2016/0134596 A1* | 5/2016 | Kovacs | H04W 12/08 726/7 |
| 2016/0205518 A1* | 7/2016 | Patel | H04L 67/1002 455/518 |
| 2016/0219019 A1* | 7/2016 | Mathur | H04L 67/16 |
| 2016/0241633 A1* | 8/2016 | Overby, Jr. | H04L 65/102 |
| 2016/0292431 A1* | 10/2016 | Sreekanti | H04L 63/00 |
| 2016/0335129 A1* | 11/2016 | Behera | G06F 9/5077 |
| 2017/0093641 A1* | 3/2017 | Utgikar | H04L 45/04 |
| 2017/0093923 A1* | 3/2017 | Duan | G06F 11/2028 |
| 2017/0103607 A1* | 4/2017 | Hajduk | G07C 15/006 |
| 2017/0126469 A1* | 5/2017 | Liang | H04L 67/1076 |
| 2017/0134477 A1* | 5/2017 | Ben Dayan | H04L 69/40 |
| 2017/0147333 A1* | 5/2017 | Bregler | G06F 8/60 |
| 2017/0154017 A1* | 6/2017 | Kristiansson | G06F 16/957 |
| 2017/0163502 A1* | 6/2017 | Macneil | H04L 43/045 |
| 2017/0180249 A1* | 6/2017 | Shen | G06F 9/45558 |
| 2017/0201490 A1* | 7/2017 | Kinder | H04L 63/0281 |
| 2017/0214550 A1* | 7/2017 | Kumar | H04L 67/1095 |
| 2018/0027080 A1* | 1/2018 | Yang | H04L 47/70 709/224 |
| 2018/0114012 A1* | 4/2018 | Sood | G06F 21/53 |
| 2018/0152534 A1* | 5/2018 | Kristiansson | G06F 8/60 |
| 2018/0205652 A1* | 7/2018 | Saxena | H04L 61/2557 |
| 2018/0270124 A1* | 9/2018 | Chugtu | H04L 67/28 |
| 2018/0270202 A1* | 9/2018 | Li | H04L 63/0263 |
| 2018/0278639 A1* | 9/2018 | Bernstein | G06F 21/577 |

OTHER PUBLICATIONS

Yegulalp, Serdar; "What is Docker? Docker containers explained," InforWorld, Sep. 6, 2018. (Year: 2018).

"What is Docker?", https://www.docker.com/what-docker, Feb. 15, 2017 (print date), 4 pages.

* cited by examiner

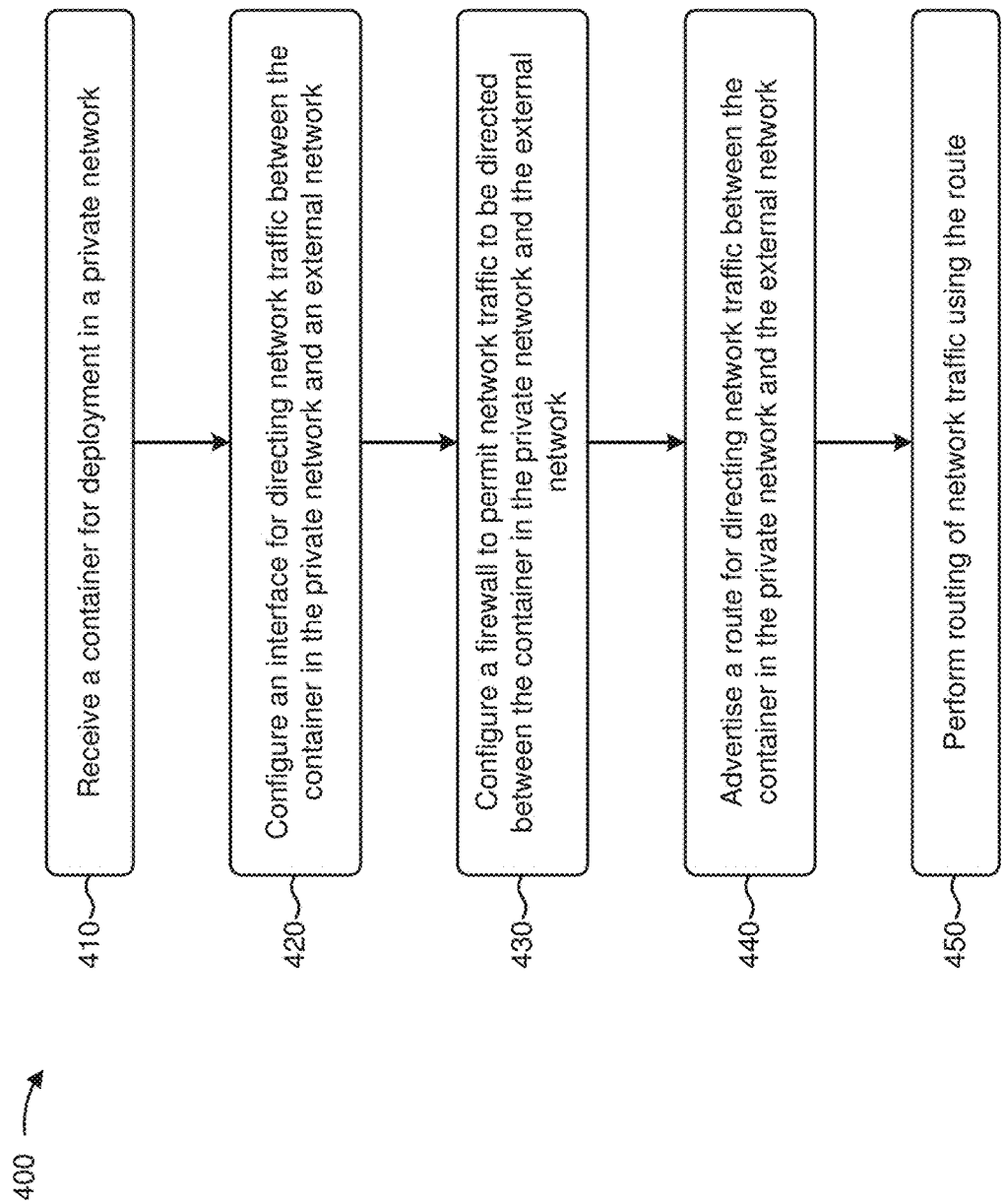

CONTAINER DEPLOYMENT FOR A NETWORK

RELATED APPLICATION

This application is a continuation of U.S. patent application Ser. No. 15/462,166 filed Mar. 17, 2017, which is incorporated herein by reference.

BACKGROUND

Containers can include self-contained execution environments for virtualization (e.g., operating system level environments or application level environments). The containers can operate in both cloud networks and non-cloud environments, as well as other virtualization environments. For example, some containers are multi-platform based, open source software packages that encapsulate applications in containers. The encapsulation includes a filesystem with code, a runtime system, system tools, and libraries that would otherwise normally be installed on a server.

BRIEF DESCRIPTION OF THE DRAWINGS

FIG. 4 is a flow chart of an example process for deploying a container in a network.

DETAILED DESCRIPTION OF PREFERRED EMBODIMENTS

The following detailed description of example implementations refers to the accompanying drawings. The same reference numbers in different drawings can identify the same or similar elements.

A private network (e.g., for a company) can include a front-end and a back-end. Applications can be deployed as back-end containers (e.g., web server containers). A container can include an interface (e.g., a network interface) with an IP address in a private range (e.g., a cluster address space). To provide services of the container to client devices via an external network (e.g., the Internet), IP connectivity needs to be established. Implementations, described herein, can provide a network device (e.g., a network orchestration device implemented as a container) of a private network to configure routing for directing network traffic between an external network and a container deployed to the private network. In this way, the network device provides container deployment and/or removal to allow for upgrade and/or downgrade of containers, thereby permitting container deployment and/or removal to occur more rapidly for networks (e.g., cloud networks). Moreover, the network device can enhance network performance relative to other network configurations that result in outdated or error causing containers to remaining installed in networks for excessive periods of time. Automatic container deployment also obviates the need for a user to manually configure routing. This results in a reduced likelihood of a configuration error and reduced utilization of network resources relative to a user providing instructions to manually configure routing and/or reducing processing relative to a user providing routing information via a client device.

Figure 1:
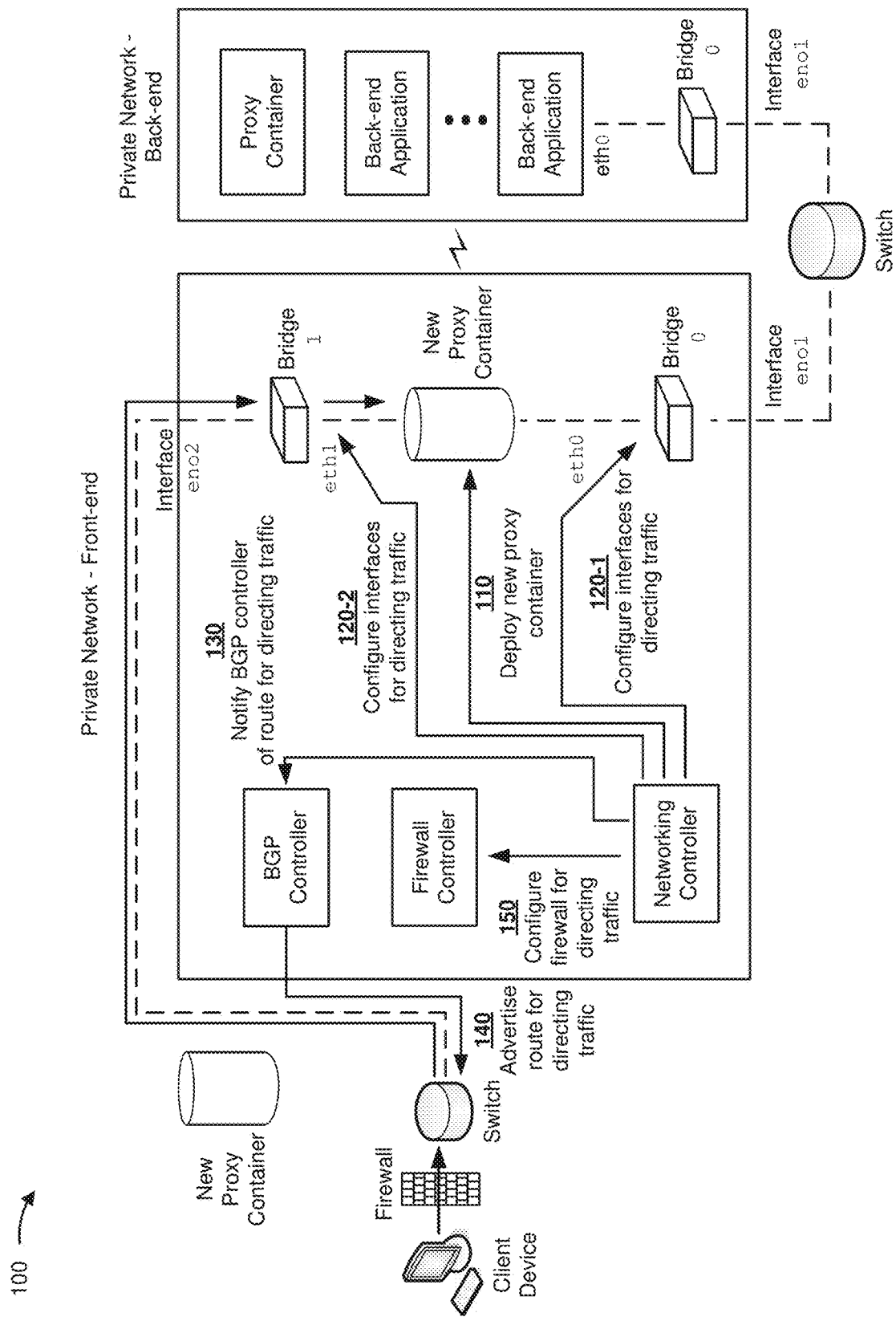
FIG. 1 is a diagram of an overview of an example implementation described herein.

FIG. 1 is a diagram of an overview of an example implementation 100 described herein. A client device of an external network can connect to a private network, which includes a front-end and a back-end, via switches and firewalls. The front-end can include platform containers, such as a networking controller, a firewall controller, and a border gateway protocol (BGP) controller. Similarly, the back-end can include one or more deployed proxy containers associated with providing application services. Network traffic can be directed through network devices (e.g., bridges, interfaces, etc.) between the front-end and the external network. The front-end can connect to the back-end via network devices (e.g., switches, interfaces, etc.).

As further shown in FIG. 1, a new proxy container can be deployed to the front-end containers deployed in the back-end. For example, the front-end of the private network can receive a particular type of proxy container to permit routing of network traffic between external devices of an external network (e.g., client devices) and network devices of the private network (e.g., applications operating on network devices of the back-end). In some implementations, the proxy container can include a web container (e.g., a hypertext transfer protocol (HTTP) proxy container), a transport protocol container (e.g., a transport control protocol (TCP) proxy container, a user datagram protocol (UDP) container, a Internet Protocol security (IPSec) protocol suite container, etc.), or the like.

Although implementations, described herein, are described in terms of, for example, a proxy container, implementations described herein may be utilized for configuring deployment of a Linux container, a Docker container, an open container, an Apache Mesos container, a virtual machine, an application package, another type of virtualization mechanism, or the like.

As further shown in FIG. 1, and by reference number 110, the networking controller can deploy the new proxy container to the front-end via one or more network devices. For example, the networking controller can cause the new proxy container to operate on a network device of the front-end (e.g., a server, a cloud computing resource, etc.). As shown by reference numbers 120-1 and 120-2, the networking controller can configure interfaces of the proxy container for directing network traffic between the back-end and the external network. For example, the networking controller can configure an interface of the new proxy container to permit routing of network traffic to and/or from external devices of the external network (e.g., client devices).

As further shown in FIG. 1, and by reference number 130, the networking controller can configure a host route for the new proxy container. For example, the networking controller can transmit a notification to the BGP controller of a route for directing network traffic between the new proxy container and the external network. As shown by reference number 140, based on transmitting the notification to the BGP controller, the networking controller can cause the BGP controller to advertise the route for directing network traffic using border gateway protocol. In this case, the BGP controller can advertise the route to, for example, an external switch to permit the external switch to route network traffic between external devices of the external network and the proxy container in the private network.

As further shown in FIG. 1, and by reference number 150, the networking controller can transmit information to the firewall controller to cause the firewall controller to configure a firewall for directing network traffic. In this case, the firewall controller can configure a dynamic firewall function of the private network to permit network traffic to be routed between external devices of the external network and the new proxy container. Based on configuring the interface of the proxy container, routing for the proxy container, and firewalling of the private network, the new proxy container can be enabled to route network traffic between external devices of the external network and applications of the back-end.

Although implementations, described herein, can be described in terms of a set of ordered actions by the networking controller, the networking controller can cause one or more actions to be performed in another order or concurrently. For example, the networking controller can cause the firewall controller to configure firewalling before causing the BGP controller to advertise a route. Similarly, the firewall controller can configure firewalling concurrently with the BGP controller advertising the route.

In this way, the networking controller can automatically incorporate a new proxy container or another type of container into a private network. This can enable upgrade and/or downgrade of containers in a reduced period of time relative to requiring each container to be manually configured. In this case, new functionalities, such as polling functionalities, firewall services, or the like, can be added as new containers, and can be deployed within the general orchestration framework of the private network. Moreover, additional proxy types can be incorporated to route network traffic to applications operating on in the back-end of the private network. Based on automatically configuring routing of network traffic, the networking controller can reduce utilization of network resources relative to a user manually configuring routing of network traffic from an external device of an external network. Moreover, based on reducing an amount of time to upgrade/downgrade containers in the private network, the networking controller can reduce a utilization of processing resources by reducing a period of time that error-causing containers, outdated containers, or the like remain in use in the private network.

As indicated above, FIG. 1 is provided merely as an example. Other examples are possible and can differ from what was described with regard to FIG. 1.

Figure 2:
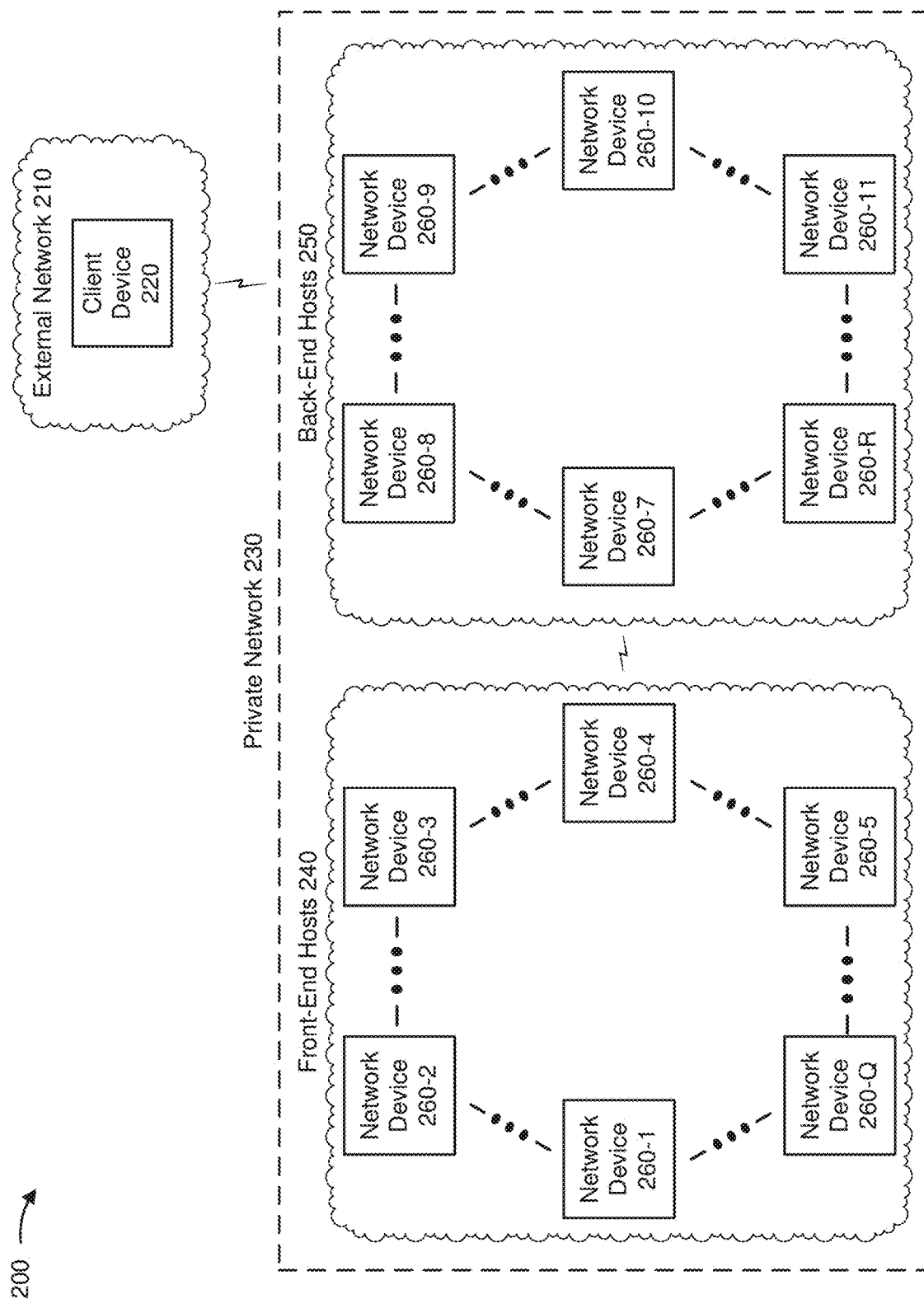
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include external network 210, client device 220, private network 230, front-end hosts 240, back-end hosts 250, and one or more network device(s) 260 (shown as network device 260-1 through network device 260-Q and network device 260-7 through network device 260-R). Devices of environment 200 can interconnect via wired connections, wireless connections, or a combination of wired and wireless connections.

External network 210 can include one or more wired and/or wireless networks. For example, external network 210 can include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Client device 220 includes one or more devices capable of receiving, generating, storing, processing, and/or providing information associated with an application deployed as a container in private network 230. For example, client device 220 can include a communication and/or computing device, such as a mobile phone (e.g., a smart phone, a radiotelephone, etc.), a computer (e.g., a laptop computer, a tablet computer, a handheld computer, a desktop computer), a gaming device, a wearable communication device (e.g., a smart wristwatch, a pair of smart eyeglasses, etc.), or a similar type of device. In some implementations, client device 220 can be utilized by a developer to develop an application and deploy the application as a container in private network 230. Additionally, or alternatively, client device 220 can be utilized by a user to access an application deployed as a container in private network 230.

Private network 230 includes an environment that includes front-end hosts 240 and back-end hosts 250. Private network 230 can be a cloud network that provides computation, software, data access, storage, etc. services that do not require end-user (e.g., client device 220) knowledge of a physical location and configuration of system(s) and/or device(s) that front-end hosts 240 and/or back-end hosts 250. Additionally, or alternatively, private network 230 can be a non-cloud based network of computing resources, such as a network associated with a data center.

Front-end hosts 240 includes a cluster of computing resources (e.g., network devices 260) associated with receiving, generating, storing, processing, and/or providing information associated with an application. For example, front-end hosts 240 can include a set of network devices 260 that can be addressable by client device 220 from external network 210. In some implementations, front-end hosts 240 can be a cluster of devices with an orchestration framework to control the cluster of devices. In some implementations, the orchestration framework can include one or more containers (e.g., platform containers). In some implementations, front-end hosts 240 can include a set of network devices 260 configured to provide access to an application via a proxy container. In some implementations, front-end hosts 240 can include a set of network devices 260 configured to provide routing, switching, processing, and/or the like of data that is to be directed to/from a container hosted via private network 230. In some implementations, network devices 260 can operate a container (e.g., a platform container) that provide a particular functionality for front-end hosts 240, such as a network service discovery manager, which can correspond to the networking controller of FIG. 1; a networking script, such as Pipework, which can correspond to the networking controller of FIG. 1; a dynamic firewall, which can correspond to the firewall controller of FIG. 1; a routing program, such as Quagga or the like, which can correspond to the BGP controller of FIG. 1; or the like. In some implementations, network devices 260 can host containers, such as Docker containers or the like.

Back-end hosts 250 includes a cluster of computing resources (e.g., network devices 260) associated with receiving, generating, storing, processing, and/or providing information associated with an application. For example, back-end hosts 250 can include a set of network devices 260 that communicate with network devices 260 of front-end hosts 240, and can communicate with client device 220 via front-end hosts 240. In other words, back-end hosts 250 might not be directly addressable by client devices 220. In some implementations, back-end hosts 250 includes applications, operating as containers on network devices 260, to provide software-as-a-service. In some implementations, back-end hosts 250 can include a first set of network devices 260 configured to provide access to an application via a container and a second set of network devices 260 configured to provide routing, switching, processing, and/or the like of data that is to be directed to/from a container hosted via private network 230.

Although implementations, described herein, are described in terms of a two-tiered network hierarchy including a front-end (e.g., front-end hosts 240) and a back-end (e.g., back-end hosts 250), another type of network configuration may be possible. For example, implementations, described herein may use a multi-tier network hierarchy (e.g., that includes one or more firewalls to separate the multiple tiers) with another quantity of tiers, a non-tiered network hierarchy, or the like.

Network device 260 includes one or more personal computers, one or more workstation computers, one or more server devices, or one or more other types of computation and/or communication devices. Additionally, or alternatively, network device 260 can include a bridge, a hub, a switch, a router, a proxy, and/or another type of network device to route network traffic. In some implementations, network device 260 can host an application via a container to provide software-as-a-service. Network device 260 can provide cloud resources and can include compute instances executing in computing resources of network device 260, storage devices provided in computing resources of network device 260, data transfer devices provided by computing resources of network device 260, etc.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3A:
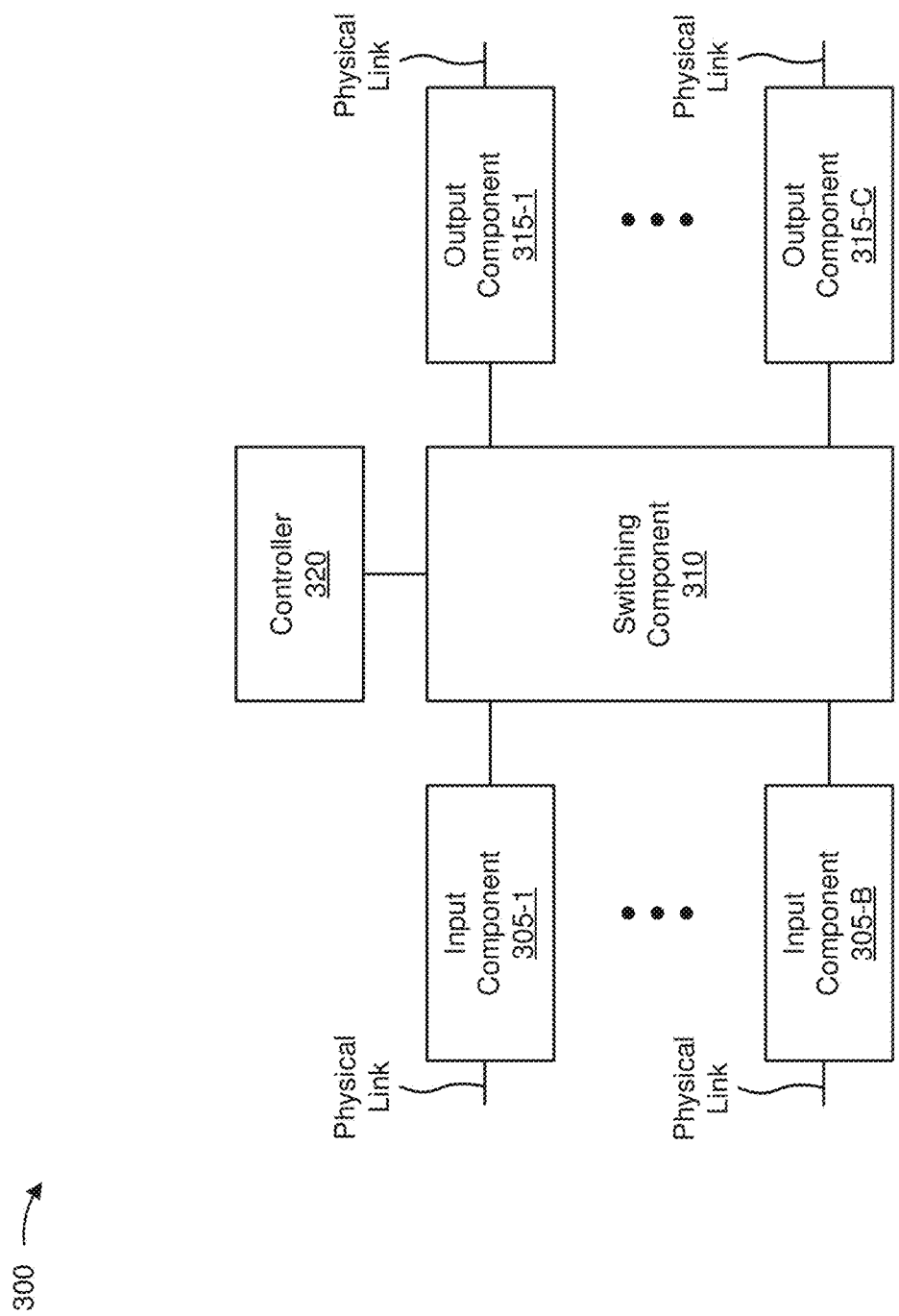
FIGS. 3A and 3B are diagrams of example components of one or more devices of FIG. 2.
Figure 3B:
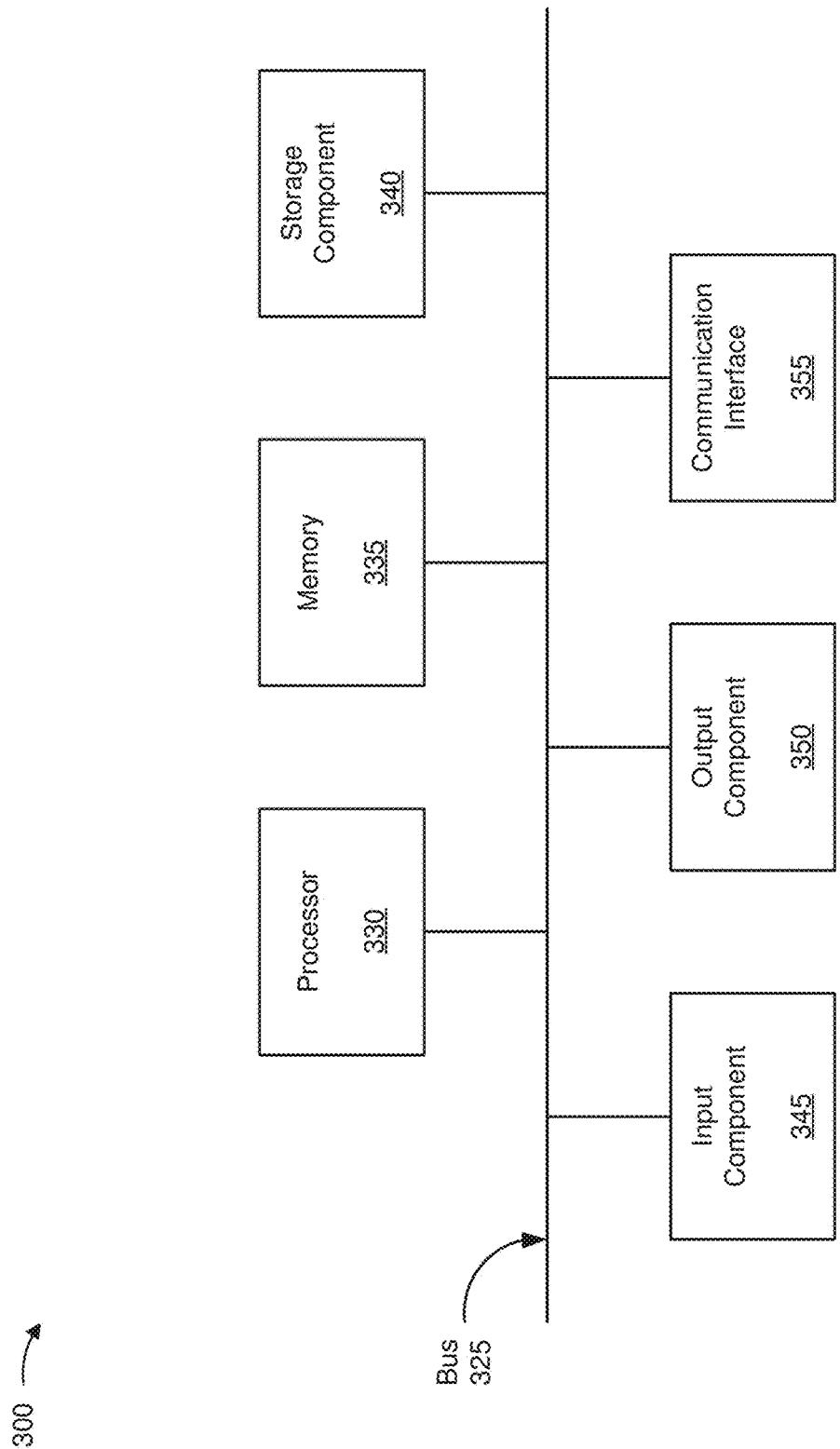

FIGS. 3A and 3B are diagrams of example components of a device 300. Device 300 can correspond to client device 220 and/or network device 260. In some implementations, client device 220 and/or network device 260 can include one or more devices 300 and/or one or more components of device 300 of FIG. 3A and/or FIG. 3B.

As shown in FIG. 3A, device 300 can include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 can be points of attachment for physical links and can be points of entry for incoming network traffic, such as packets. Input component 305 can process incoming network traffic, such as by performing data link layer encapsulation or decapsulation. In some implementations, input component 305 can send and/or receive packets. In some implementations, input component 305 can include an input line card that includes one or more packet processing components (e.g., in the form of integrated circuits), such as one or more interface cards (IFCs), packet forwarding components, line card controller components, input ports, processors, memories, and/or input queues. In some implementations, device 300 can include one or more input components 305.

Switching component 310 can interconnect input components 305 with output components 315. In some implementations, switching component 310 can be implemented via one or more crossbars, via busses, and/or with shared memories. The shared memories can act as temporary buffers to store packets from input components 305 before the packets are eventually scheduled for delivery to output components 315. In some implementations, switching component 310 can enable input components 305, output components 315, and/or controller 320 to communicate.

Output component 315 can store packets and can schedule packets for transmission on output physical links. Output component 315 can support data link layer encapsulation or decapsulation, and/or a variety of higher-level protocols. In some implementations, output component 315 can send packets and/or receive packets. In some implementations, output component 315 can include an output line card that includes one or more packet processing components (e.g., in the form of integrated circuits), such as one or more IFCs, packet forwarding components, line card controller components, output ports, processors, memories, and/or output queues. In some implementations, device 300 can include one or more output components 315. In some implementations, input component 305 and output component 315 can be implemented by the same set of components (e.g., and input/output component can be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 can include one or more processors that can be programmed to perform a function.

In some implementations, controller 320 can include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 can communicate with other devices, networks, and/or systems connected to device 300 to exchange information regarding network topology. Controller 320 can create routing tables based on the network topology information, create forwarding tables based on the routing tables, and forward the forwarding tables to input components 305 and/or output components 315. Input components 305 and/or output components 315 can use the forwarding tables to perform route lookups for incoming and/or outgoing packets.

Controller 320 can perform one or more processes described herein. Controller 320 can perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions can be read into a memory and/or storage component associated with controller 320 from another computer-readable medium or from another device via a communication interface. When executed, software instructions stored in a memory and/or storage component associated with controller 320 can cause controller 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

As shown in FIG. 3B, device 300 can include a bus 325, a processor 330, a memory 335, a storage component 340, an input component 345, an output component 350, and a communication interface 355.

Bus 325 includes a component that permits communication among the components of device 300. Processor 330 is implemented in hardware, firmware, or a combination of hardware and software. Processor 330 is implemented in hardware, firmware, or a combination of hardware and software. Processor 330 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 330 includes one or more processors capable of being programmed to perform a function. Memory 335 includes a random access memory (RAM), a read only memory (ROM), and/or another type of dynamic or static storage device (e.g., a flash memory, a magnetic memory, and/or an optical memory) that stores information and/or instructions for use by processor 330.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 345 includes a component that permits device 300 to receive information, such as via user input (e.g., a touch screen display, a keyboard, a keypad, a mouse, a button, a switch, and/or a microphone). Additionally, or alternatively, input component 345 can include a sensor for sensing information (e.g., a global positioning system (GPS) component, an accelerometer, a gyroscope, and/or an actuator). Output component 350 includes a component that provides output information from device 300 (e.g., a display, a speaker, and/or one or more light-emitting diodes (LEDs)).

Communication interface 355 includes a transceiver-like component (e.g., a transceiver and/or a separate receiver and transmitter) that enables device 300 to communicate with other devices, such as via a wired connection, a wireless connection, or a combination of wired and wireless connections. Communication interface 355 can permit device 300 to receive information from another device and/or provide information to another device. For example, communication interface 355 can include an Ethernet interface, an optical interface, a coaxial interface, an infrared interface, a radio frequency (RF) interface, a universal serial bus (USB) interface, a Wi-Fi interface, a cellular network interface, and/or the like.

Software instructions can be read into memory 335 and/or storage component 340 from another computer-readable medium or from another device via communication interface 355. When executed, software instructions stored in memory 335 and/or storage component 340 can cause processor 330 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIGS. 3A and 3B are provided as an example. In practice, device 300 can include additional components, fewer components, different components, or differently arranged components than those shown in FIGS. 3A and 3B. Additionally, or alternatively, a set of components (e.g., one or more components) of device 300 can perform one or more functions described as being performed by another set of components of device 300.

FIG. 4 is a flow chart of an example process 400 for deploying a container in a network. In some implementations, one or more process blocks of FIG. 4 can be performed by network device 260. In some implementations, one or more process blocks of FIG. 4 can be performed by another device or a group of devices separate from or including network device 260, such as client device 220.

As shown in FIG. 4, process 400 can include receiving a container for deployment in a private network (block 410). For example, network device 260 can receive a platform container, a proxy container, or the like, such as from client device 220, from a data structure storing containers for deployment, or the like. In some implementations, network device 260 can obtain the container from a repository of containers. For example, based on client device 220 of external network 210 requesting a particular service (e.g., an Apache web server service) from a container operated in back-end hosts 250, network device 260 can obtain a container to provide IP connectivity. In some implementations, network device 260 can obtain a proxy container that adds a particular functionality (e.g., networking, firewalling, threat detection, data analytics, data processing, etc.) to private network 230. Additionally, or alternatively, network device 260 can obtain a proxy container for an HTTP service, a TCP service, a UDP service, or the like, to be deployed on front-end hosts 240 of private network 230.

As further shown in FIG. 4, process 400 can include configuring an interface for directing network traffic between the container in the private network and an external network (block 420). For example, a network device 260 of private network 230 (e.g., a networking controller) can configure interfaces for directing network traffic between the proxy container and client device 220 of external network 210. In some implementations, network device 260 can configure connectivity between a first interface and a second interface. For example, the container can include a first interface for routing traffic between the container and back-end hosts 250, and network device 260 can configure a second interface for routing traffic between front-end hosts 240 (e.g., the container) and external network 210. In this case, network device 260 can connect the first interface and the second interface to permit the container to proxy data between external network 210 and one or more applications or containers operating on network devices 260 of back-end hosts 250. In some implementations, the first interface can be associated with a network address in a cluster address range of private network 230 (e.g., a private address range) and the second interface can be associated with a network address in a public address range. In some implementations, network device 260 (e.g., a platform container operating on network device 260) can use representational state transfer (RESTful) application programming interfaces (APIs) to configure the interface of a proxy container. For example, the networking controller can verify metadata of the proxy container.

As further shown in FIG. 4, process 400 can include configuring a firewall to permit network traffic to be directed between the container in the private network and the external network (block 430). For example, a first network device 260 of private network 230 (e.g., a networking controller) can configure a second network device 260 of private network 230 (e.g., a firewall controller) to permit network traffic to be routed to the configured interface associated with the container without being filtered. In some implementations, the networking controller can cause the firewall controller to store a rule regarding routing network traffic to the container, such as in an Internet Protocol (IP) table of routing rules, to permit network traffic to be routed between the configured interface of the container and, for example, client device 220.

As further shown in FIG. 4, process 400 can include advertising a route for directing network traffic between the container in the private network and the external network (block 440). For example, a first network device 260 of private network 230 (e.g., the networking controller) can provide the route to one or more second network devices 260 (e.g., one or more switches) to store in a routing table to enable routing. In some implementations, the networking controller can transmit information to a third network device 260 of private network 230 (e.g., the BGP controller) identifying the configured interface and a route for directing network traffic between the configured interface and, for example, client device 220. For example, the networking controller can cause the BGP controller to advertise the route using border gateway protocol to one or more other network devices 260 (e.g., one or more switches, routers, hubs, bridges, etc.) to cause the one or more other network devices 260 to route network traffic using the route.

As further shown in FIG. 4, process 400 can include performing routing of network traffic using the route (block 450). For example, network device 260 of private network 230 can receive network traffic to be directed to back-end hosts 250 of private network 230 (e.g., via the container operating on network device 260 or another network device 260) and can route the network traffic using the route. Similarly, network device 260 can route network traffic from the container to external network 210 (e.g., to client device 220). For example, network device 260 can route network traffic between applications operating in back-end hosts 250 and client devices 220 operating on external network 210 based on configuring the interface, configuring the firewall, and advertising the route.

In some implementations, network device 260 can monitor a running state of the container, such as by subscribing to an event monitoring service (e.g., a Docker event monitoring service). For example, network device 260 can detect, based on receiving an indication from the event monitoring service, that a container has exited (e.g., has been deleted, crashed, received external instructions from client device 220 to cease providing service, etc.). In this case, network device 260 can analyze the proxy container, using a set of API calls associated with private network 230, to confirm that the container has exited, and can remove the route associated with the container, such as by transmitting information to another network device 260 (e.g., the BGP controller) to advertise, via border gateway protocol peering, that the route is removed. Similarly, network device 260 can reconfigure the firewall to remove an IP table rule associated with passing network traffic to the container.

In some implementations, when performing routing of network traffic, first network device 260 can periodically use a set of API calls to monitor a routing table of a second network device 260. For example, first network device 260 can ping an external service IP address for each host route in the routing table to monitor front-end hosts 240 and determine a status of the container. In this case, if the ping goes unanswered, first network device 260 can detect a trigger to remove the container, and can use an API call to initiate removal of a container, such as by causing a route to be removed from the routing table, reconfiguring the firewall, etc.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, network device 260 automatically deploys and configures containers in private network 230. Based on automatically configuring and deploying containers, network device 260 reduces an amount of time to upgrade and/or downgrade containers in private network 230 relative to requiring user configuration, thus improving computing by reducing an amount of time that out of date and error-causing containers are deployed. Moreover, based on obviating a need for a user to manually configure routing in private network 230, network device 260 reduces network traffic relative to requiring a user to configure routing via a client device 220 operating in external network 210.

Furthermore, network devices 260 of front-end hosts 240 are configured as a safe zone (e.g., a DMZ) between external network 210 and application containers running on network devices 260 of back-end hosts 250. This architecture ensures that network traffic to and from external network 210 is proxied through proxy containers operating on network devices 260 of front-end hosts 240. Full control of the external interface of the proxy container, routing table, and dynamic firewall is maintained on network devices 260 of front-end hosts 240, thus allowing a flexible implementation of a security policy. This configuration also allows independent scaling of front-end proxying capabilities of network devices 260 and back-end application server processing capabilities, enabling load balancing for private network 230. New functions can easily be added in the form of new platform containers implementing new micro-services.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    identifying, by a device, a container that is deployed in a front-end of a first network,
        the container including a first interface that is configured for directing network traffic between the front-end of the first network and one or more applications operating in a of the first network, the first interface being associated with a network address in a cluster address range of a private network;
    configuring, by the device, a second interface of the container for directing network traffic between a second network and the container,
        the second interface being associated with a network address in a public address range; and
    performing, by the device and using the container, routing of network traffic between the one or more applications operating in the back-end of the first network and the second network.

2. The method of claim 1, wherein the container is a proxy container,
    the proxy container providing, for the network traffic, at least one of:
        firewall functionality,
        threat detection functionality,
        data analytics functionality, or
        data processing functionality.

3. The method of claim 1, further comprising:
    transmitting a notification to a border gateway protocol (BGP) controller,
        the notification including data that causes the BGP controller to configure a host route for directing other network traffic between the container and the second network.

4. The method of claim 1, further comprising:
    receiving a request for a particular service associated with the container;
    obtaining, based on the particular service, the container from a repository of containers; and
    deploying the container based on the request.

5. The method of claim 1, further comprising:
    monitoring a running state of the container;
    detecting, based on monitoring the running state, that the container has been exited; and
    removing, based on detecting that the container has been exited, a route associated with the container.

6. The method of claim 5, further comprising:
    analyzing the container, prior to removing the route and using a set of application programming interface (API) calls associated with the first network, to confirm that the container has been exited.

7. The method of claim 1, further comprising:
    configuring, by using representational state transfer (RESTful) application programming interfaces (APIs), at least one of:
        the first interface, or
        the second interface.

8. A device, comprising:
    one or more memories; and
    one or more processors, communicatively coupled to the one or more memories, to:
        identify a container that is deployed in a front-end of a first network,
            the container including a first interface that is configured for directing network traffic between the front-end of the first network and one or more applications operating in a back-end of the first network,
            the first interface being associated with a network address in a cluster address range of a private network;
        configure a second interface of the container for directing network traffic between a second network and the container,
            the second interface being associated with a network address in a public address range; and
        perform, using the container, routing of network traffic between the one or more applications operating in the back-end of the first network and the second network.

9. The device of claim 8, wherein the container is a proxy container,
    the proxy container providing, for the network traffic, at least one of:
        firewall functionality,
        threat detection functionality,
        data analytics functionality, or
        data processing functionality.

10. The device of claim 8, wherein the one or more processors are further to:
    transmit a notification to a border gateway protocol (BGP) controller,
        the notification including data that causes the BGP controller to configure a host route for directing other network traffic between the container and the second network.

11. The device of claim 8, wherein the one or more processors are further to:
- receive, from the one or more applications, other network traffic directed to the second network; and
- route the other network traffic to the second network.

12. The device of claim 8, wherein the one or more processors are further to:
- receive a request for a particular service associated with the container;
- obtain, based on the particular service, the container from a repository of containers; and
- deploy the container based on the request.

13. The device of claim 8, wherein the one or more processors are further to:
- monitor a running state of the container;
- detect, based on monitoring the running state, that the container has been exited; and
- remove, based on detecting that the container has been exited, a route associated with the container.

14. The device of claim 13, wherein the one or more processors are further configured to:
- analyze the container, prior to removing the route and using a set of application programming interface (API) calls associated with the first network, to confirm that the container has been exited.

15. A non-transitory computer-readable medium storing instructions, the instructions comprising:
- one or more instructions that, when executed by one or more processors, cause the one or more processors to:
  - identify a container that is deployed in a front-end of a first network,
    - the container including a first interface that is configured for directing network traffic between the front-end of the first network and one or more applications operating in a back-end of the first network,
      - the first interface being associated with a network address in a cluster address range of a private network;
  - configure a second interface of the container for directing network traffic between a second network and the container,
    - the second interface being associated with a network address in a public address range; and
  - perform, using the container, routing of network traffic between the one or more applications operating in the back-end of the first network and the second network.

16. The non-transitory computer-readable medium of claim 15, wherein the container is a proxy container,
- the proxy container providing, for the network traffic, at least one of:
  - firewall functionality,
  - threat detection functionality,
  - data analytics functionality, or
  - data processing functionality.

17. The non-transitory computer-readable medium of claim 15, wherein the one or more instructions, when executed by the one or more processors, further cause the one or more processors to:
- transmit a notification to a border gateway protocol (BGP) controller,
  - the notification including data that causes the BGP controller to configure a host route for directing other network traffic between the container and the second network.

18. The non-transitory computer-readable medium of claim 15, wherein the one or more instructions, when executed by the one or more processors, further cause the one or more processors to:
- receive, from the one or more applications, other network traffic directed to the second network; and
- route the other network traffic to the second network.

19. The non-transitory computer-readable medium of claim 15, wherein the one or more instructions, when executed by the one or more processors, further cause the one or more processors to:
- receive a request for a particular service associated with the container;
- obtain, based on the particular service, the container from a repository of containers; and
- deploy the container based on the request.

20. The non-transitory computer-readable medium of claim 15, wherein the one or more instructions, when executed by the one or more processors, further cause the one or more processors to:
- monitor a running state of the container;
- detect, based on monitoring the running state, that the container has been exited; and
- remove, based on detecting that the container has been exited, a route associated with the container.

* * * * *